UNITED STATES PATENT OFFICE.

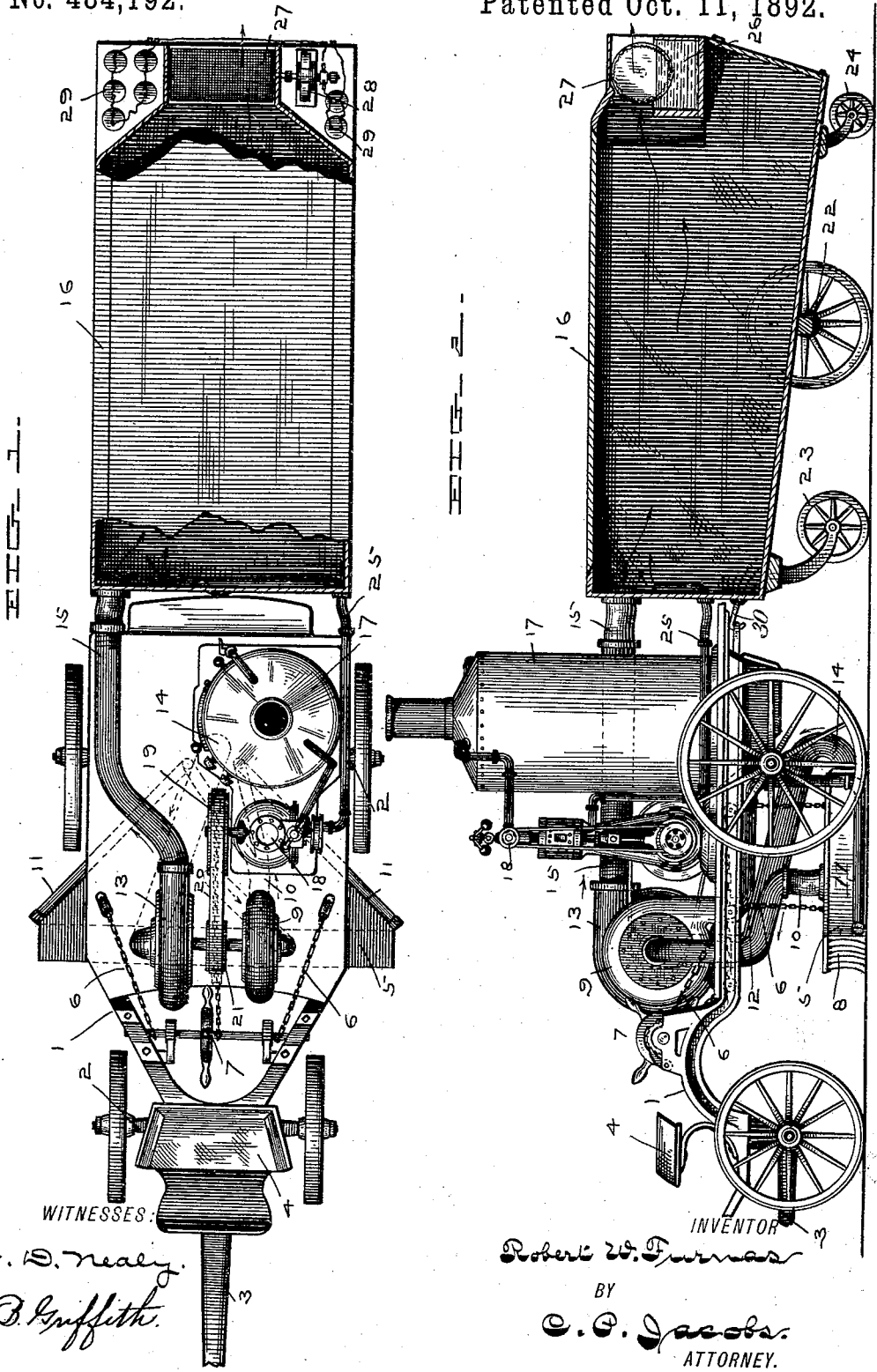

ROBERT W. FURNAS, OF INDIANAPOLIS, INDIANA.

STREET-CLEANING MACHINE.

SPECIFICATION forming part of Letters Patent No. 484,192, dated October 11, 1892.

Application filed December 26, 1891. Serial No. 416,144. (No model.)

*To all whom it may concern:*

Be it known that I, ROBERT W. FURNAS, of Indianapolis, county of Marion, and State of Indiana, have invented certain new and useful Improvements in Street-Cleaning Machines; and I do hereby declare that the following is a full, clear, and exact description thereof, reference being had to the accompanying drawings, in which like figures refer to like parts.

My invention relates to the construction of street-cleaning machines, and is an improvement upon and a modification of the device shown in an application filed by me on the 21st day of December, 1891, Serial No. 415,805, and will be understood from the following description.

In the drawings, Figure 1 is a top plan view of my machine, the cover of the dust-box being partly broken away. Fig. 2 is a side elevation of the main part of the machine, the dust-box being in longitudinal section.

In detail, 1 is a framework mounted upon trucks 2, having a pole 3 and a seat 4 for the driver. 5 is a gathering-hood adjustably suspended from the framework by chains 6, and 7 is a windlass for raising and lowering the same. 8 are scratching-teeth connected to the hood for loosening the dirt in advance. 9 is a gathering-fan connected by an elastic hose or pipe 10 to the top of the hood, the latter being preferably in triangular shape, its rear sides having pipes 11 connected thereto, which form air-chambers, and these pipes extend inward, connecting with the branch delivery-pipes 12, which are in turn connected by a single mouth with the gathering-fan 9. 13 is the main suction-fan which is connected by an elastic hose 14 to the rear of the central part of the gathering-hood, the object of this fan 13 being to take up the dirt which has been previously collected below the central part of the hood by the gathering-fan 9. 15 is a discharge-pipe leading from the fan to the dust-box 16. 17 is the boiler, and 18 the steam-engine, which drives the fans, a driving-pulley 19 being mounted on the outer end of the engine-shaft, connected by a belt 20 to a similar pulley 21 on the fan-shaft. All this part of the mechanism is substantially the same as that shown in my former application, the present invention consisting in the arrangements made for disposing of the material collected by the fans.

The dust-box 16 is mounted on trucks 22, and has a front wheel 23 and a rear wheel 24, as shown in Fig. 2.

25 is a pipe leading from the exhaust-port of the cylinder to the dust-box for the purpose of utilizing the exhaust-steam to spray the dirt and dust that is carried into this box by means of the delivery-pipe 15 of the main fan. At the rear of the dust-box is a trough 26, containing water, and 27 is a cylindrical screen mounted in bearings in the sides of the trough and driven conveniently by a motor 28, worked by storage-batteries 29, as shown in Fig. 1, though any other form of driving mechanism may be used, if desired. The dust-box 16 is detachably connected to the truck-frame of the cleaning-machine by hooks or shackles 30, as shown in Fig. 2, so as to allow it to be taken away for the purpose of emptying or discharging the dust collected.

The operation of the device is as follows: The dust, having been huddled or collected by the action of the gathering-fan 9, is drawn up and forced by the fan 13 through the delivery-pipe 15 into the dust-box 16, the heavier material falling by gravity to the bottom of this box at once, and as the exhaust-steam from the engine 18 through the pipe 25 is discharged into the box and comes in contact with the lighter dust it thereby makes it heavier and causes it to fall, also, to the bottom of the box. Should any of the very light dust or dirt not find its way to the bottom of the box it will be caught in the meshes of the revolving cylinder 27, which, being partly submerged in water, will detain the dust here collected, while the air will blow directly through the meshes of the cylinder out at the rear of the machine. When a sufficient quantity has been collected, the dust-box may be detached from the main machine and removed for the purpose of emptying and cleaning. The method of collecting the dirt by means of the action of the fans is precisely the same as that shown in my former application, the present invention relating more particularly to the method of discharging and disposing of the dust collected by the fans.

What I claim as my invention, and desire to secure by Letters Patent, is the following:

1. In a street-cleaning machine, a portable dust-box detachably connected to the rear thereof, a water-trough at the rear of such dust-box, and a cylindrical screen revolving in bearings in such trough and partly submerged in water while in operation with means for revolving the screen, and such dust-box being provided with an opening behind the screen, permitting the passage of air, substantially as shown and described.

2. In a street-sweeping machine, means for collecting and taking the dirt from the pavement, a fan and connections for delivering the dirt to a dirt-receptacle, an engine for actuating the dirt-collecting means and the fan, a dirt-receptacle connected to the machine, and an exhaust-pipe leading from the engine-cylinder into the dirt-receptacle for spraying the material deposited therein, substantially as shown and described.

3. In a street-sweeping machine, the combination of means for collecting and taking the dirt from the pavement, a fan and connections for delivering the dirt to a dirt-receptacle, an engine for actuating the dirt-collecting means and the fan, a dirt-receptacle connected to the machine, and an exhaust-pipe leading from the engine-cylinder into the dirt-receptacle for spraying the material deposited therein, an opening provided in the rear end of such dirt-receptacle, and a water-trough supported therein with a cylindrical screen revolving in bearings in such trough before the opening and partly submerged in water while in operation with means for revolving such screen, substantially as shown and described.

In witness whereof I have hereunto set my hand this 14th day of December, 1891.

ROBERT W. FURNAS.

Witnesses:
 E. B. GRIFFITH,
 H. D. NEALY.